(No Model.) 2 Sheets—Sheet 1.
J. HARRISON.
FRUIT PITTING AND SPREADING MACHINE.
No. 575,886. Patented Jan. 26, 1897.
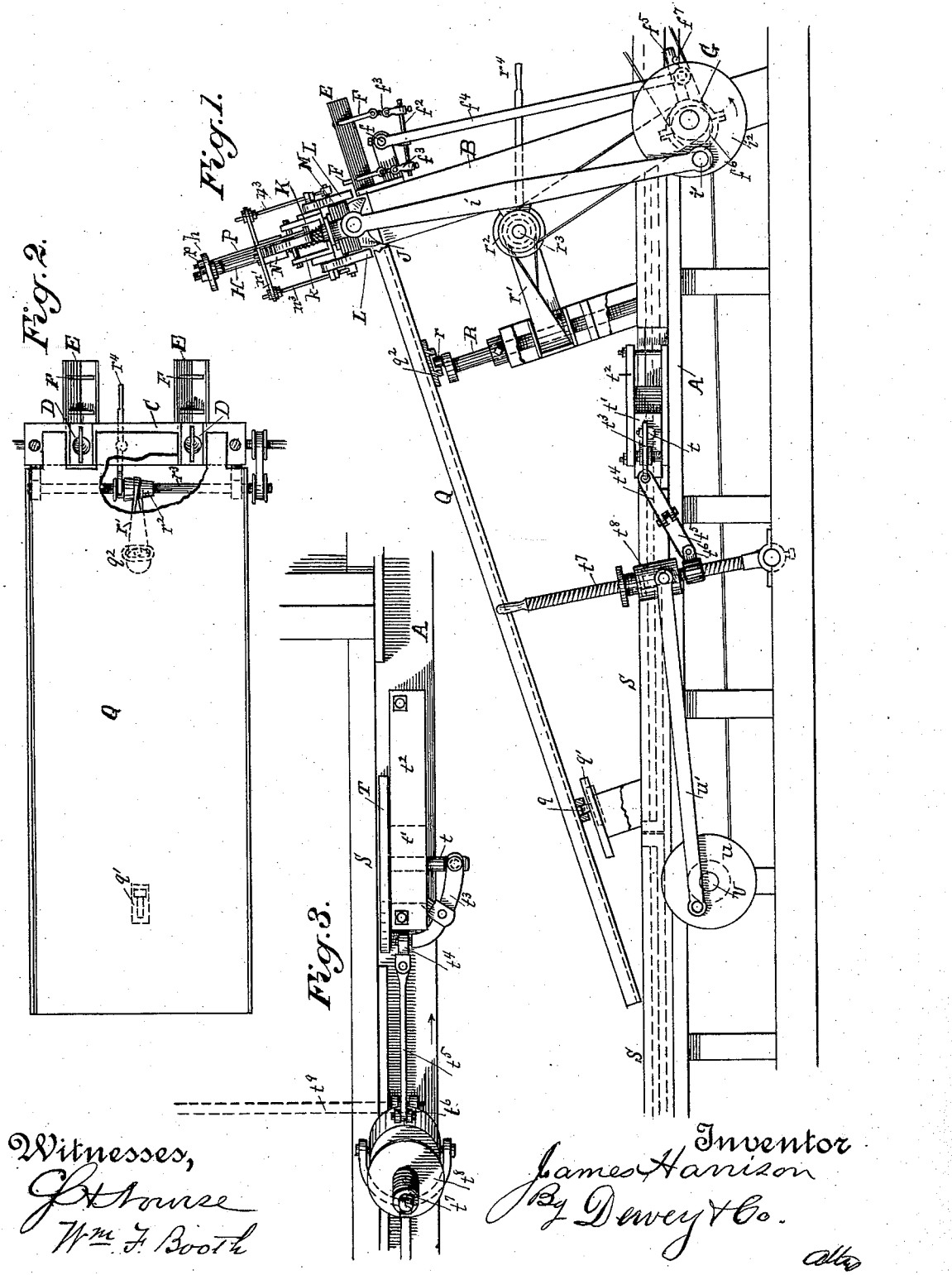
Witnesses,
G. H. Towse
W. F. Booth
Inventor
James Harrison
By Dewey & Co.

(No Model.) 2 Sheets—Sheet 2.

J. HARRISON.
FRUIT PITTING AND SPREADING MACHINE.

No. 575,886. Patented Jan. 26, 1897.

Witnesses,
J. H. Nourse
Wm. F. Booth

Inventor,
James Harrison
By Dewey & Co.
attys

UNITED STATES PATENT OFFICE.

JAMES HARRISON, OF VACAVILLE, CALIFORNIA, ASSIGNOR OF ONE-THIRD TO JAMES T. FOSTER, OF BERKELEY, CALIFORNIA.

FRUIT PITTING AND SPREADING MACHINE.

SPECIFICATION forming part of Letters Patent No. 575,886, dated January 26, 1897.

Application filed March 16, 1896. Serial No. 583,310. (No model.)

*To all whom it may concern:*

Be it known that I, JAMES HARRISON, a citizen of the United States, residing at Vacaville, county of Solano, State of California, have invented an Improvement in Fruit Pitting and Spreading Machines; and I hereby declare the following to be a full, clear, and exact description of the same.

My invention relates to the class of machines for removing the pits or stones from fruit and dividing and spreading the divided fruit on trays preparatory to drying.

My invention consists in the novel feeding mechanism, the means for pitting, dividing, and separating the divided fruit, the means for receiving and advancing the divided sections of fruit and spreading them upon the trays, the means for advancing the trays, and other details of construction, arrangement, and combination which I shall hereinafter fully describe.

The object of my invention is to provide a simple, practical, and effective machine for pitting and spreading fruit.

Figure 4:
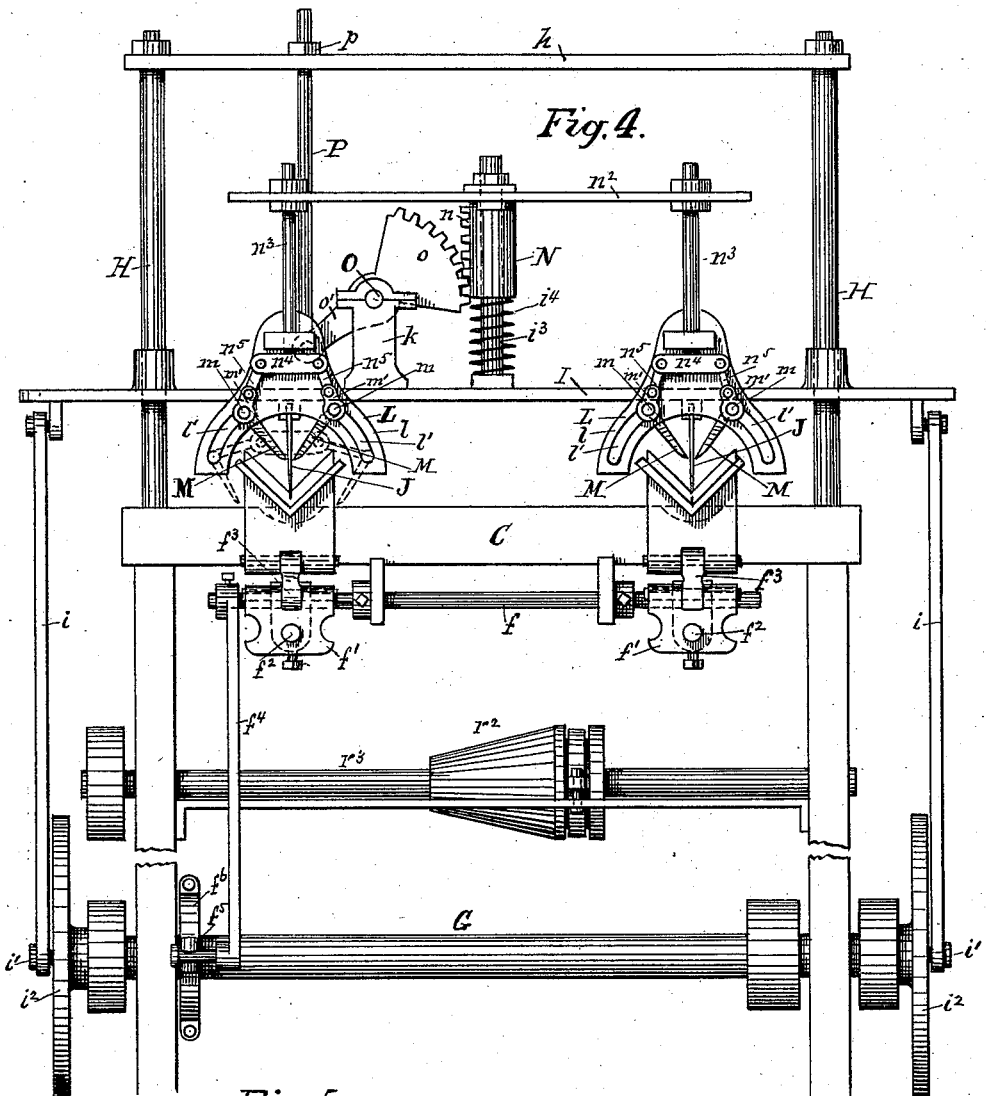
Figure 5:
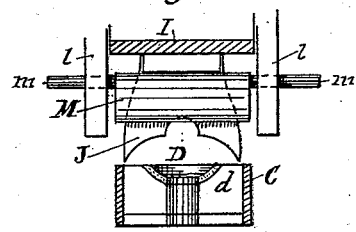
Figure 6:
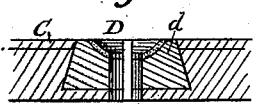

Referring to the accompanying drawings, Figure 1 is a side elevation of my machine. Fig. 2 is a top view showing the feeding-chutes, the socketed fruit-seats, and the shaking receiving-table. Fig. 3 is a top view of the tray-feeding mechanism. Fig. 4 is an elevation taken from the head of the machine. Fig. 5 is a side view and section of the operating-knives and fruit-sockets. Fig. 6 is a section of the fruit-socket.

A is a frame, from the head of which rise standards B, preferably set at an inclination, as shown. Upon these standards is supported a cross-bar C, in which are the socketed fruit-seats D, as best shown in Fig. 2, said seats consisting of the usual perforated and slitted cushion-blocks $d$, as shown clearly in Figs. 2, 5, and 6. There may be as many of these seats as desired, and for the purpose of illustration I have here shown two.

Secured to the bar C are the feed-chutes E, Figs. 1 and 2, and these are V-shaped, as seen in Fig. 4. They are inclined and lead down to the bar, so that the fruit will be delivered to the sockets D. In these chutes are the controlling-gates F, passing up through the bottoms of the chutes and adapted by their reciprocation to alternately free and close the chutes. They reciprocate alternately and are operated by means of a rock-shaft $f$, Figs. 2 and 4, having cranks $f'$, connected with tilting rods $f^2$, which are flexibly connected by links $f^3$ with the gates. The shaft $f$ is rocked by a connecting-rod $f^4$, engaging a lever $f^5$ on a main shaft G below.

The connection between the rod $f^4$ and the lever $f^5$ is preferably an adjustable one, as shown by the notches $f^7$ in Fig. 1, whereby the length of communicated stroke may be varied. Thus a fruit being supplied to chute E is allowed to pass down by gravity by the lowering of the first gate F and is stopped by the rising of the second gate F, and then it is allowed to advance again by the lowering of said second gate, while a succeeding one is stopped by the rising of the first gate, and thus the fruit is successively fed to the socketed seats D. The purpose and object of making the chutes V-shaped are to hold the fruit in proper upright position with its seam up, and so guide it down in this position to the seats D.

H are fixed guide-rods, Fig. 4, on which is fitted and adapted to slide vertically a cross-plate I, which is raised and lowered by means of pitmen $i$, extending from wrist-pins $i'$ on crank-disks $i^2$ on the main shaft G below. To the under side of this cross-plate are secured the splitting and pitting knives J, Figs. 1, 4, and 5. These, as seen in Fig. 5, have the usual concave faces with central depressions, and they lie immediately above the slitted fruit-seats and are adapted, when brought down upon the fruit, to cut its flesh all around to the pit and to force said pit down through the perforated seats D, said pits being supposed to be properly disposed of below.

Secured to the upper surface of cross-plate I are brackets K, Fig. 1, to each end of which is rigidly secured a cam-plate L, Fig. 4, in the depending arms $l$ of which are made divergent cam-grooves $l'$. Fitted and adapted to slide in these cam-grooves are the end pins or pivots $m$ of the auxiliary or separating knives M, Figs. 1, 4, and 5. There are two of these to each main knife J, as is best seen in Fig. 4, one being on each side and lying at an angle to said knives J, with their inner edges normally close thereto.

Rising from the center of the cross-plate I is a fixed guide-rod $i^3$, on which is fitted and adapted to slide a sleeve N, having rack-teeth $n$ on its side, Fig. 4. A spring $i^4$ holds this sleeve normally in an elevated position. Secured to the top of this rack-sleeve is a cross-bar $n'$, Fig. 1, which carries at each end a bar $n^2$, Fig. 4, and from the extremities of these bars depend rods $n^3$, Figs. 1 and 4, which pass down through suitable guides and have their lower extremities connected with cross-feet $n^4$, Fig. 4, from which extend pivoted links $n^5$ to short crank-lugs $m'$ on the pivots or pins $m$ of the auxiliary or separating knives M.

Rising from one of the brackets K are bearings $k$, in which is journaled a shaft O, carrying a segment-gear $o$, meshing with the rack-sleeve N, Fig. 4. This segment-gear has a lever-arm $o'$, to which is attached an uprising rod P, passing freely up through a cross-yoke $h$, extending between the tops of the guide-rods H, Fig. 4, said rod P having a stop nut or collar $p$ above the cross-yoke.

The operation of this mechanism is as follows: The fruit being in its seat, the cross-plate I moves down, carrying with it the knives J and the knives M with all the operating mechanism of the latter. During this movement the knives M are in the position of Fig. 4 and are so held by the spring $i^4$. The knives J now encounter and split the fruit and force the pit down, and the knives M enter the split top of the fruit. But now the stop-collar $p$ on top of rod P contacts with the cross-yoke $h$, and this causes a downward movement of the segment-gear $o$, which thus forces the rack-sleeve N down, so that said sleeve now has an additional and independent downward movement. The sleeve carries down its top bars $n'$ and $n^2$ and the rods $n^3$ also, and these latter, through the cross-feet $n^4$, links $n^5$, and crank-lugs $m'$, force the auxiliary knives M down and at the same time turn them on their end pins $m$, so that said knives move on down farther in the fruit and also spread outwardly, thereby separating the divided sections of the fruit and laying or spreading them out on their backs. As the cross-plate I moves up the spring $i^4$ returns the parts to normal position ready for a repetition of the operation.

The stop $p$ being a nut may be adjusted to vary the stroke of the auxiliary knives.

Q is the inclined receiving and advancing table. At its lower end it is supported upon a lug $q$, adapted to slide lengthwise in a guide $q'$, rising from the frame A, Figs. 1 and 2. Near its upper end it has fitted to its under side a grooved bearing $q^2$, the groove in which is oblong, Fig. 2, and extends in the direction of the width of the table. Into this groove fits a crank-pin $r$ on the top of a shaft R, motion to which is imparted by means of a belt $r'$, extending from a cone-pulley $r^2$, Figs. 2 and 4, on a counter-shaft $r^3$, to which revolution is imparted by means of suitable belting and pulleys (shown clearly in Fig. 1) from the main shaft G. The cone-pulley $r^2$ is adapted to be adjusted upon its shaft by means of the lever $r^4$, (shown in Fig. 2,) whereby the motion transmitted to the table Q may be varied to suit the circumstances. The upper end of the table, as seen in Figs. 1 and 2, overlaps the bar C, in which the socketed fruit-seats D are located, and said table is cut out, as shown in Fig. 2, sufficiently to expose said seats and yet be near enough on each side of them to receive the fruit therefrom as its sections are laid or spread open by the knives M.

The shaking movement imparted to the table by the crank-pin $r$ is, on account of the oblong slot in bearing $q^2$ and its transverse direction, more of a longitudinal than a side shake, especially in view of the arrangement of the lower support $q$, and this movement serves to advance the separated fruit-sections down the inclined table to the lower end, from which they are discharged and spread out upon the trays S. These trays are seated and adapted to be moved along in suitable guides in the frame A, being introduced from the rear end and pushed along against one another. There may be either a hand or an automatic feed of the trays. Referring to Figs. 1 and 3, it will be seen that there is arranged alongside of and adapted to be moved into frictional contact with the tray a clutch-plate T, the shank or stem $t$ of which passes freely through a sliding block $t'$ in a guide $t^2$. To the projecting outer end of the stem $t$ is connected a pivoted lever $t^3$, to the other extremity of which is connected a link $t^4$, to which is attached a connecting-rod $t^5$. This rod is pivoted to a lug $t^6$ on a swinging handle $t^7$. On this handle is a nut $t^8$, adjustable vertically thereon. Now by drawing forwardly on this handle, that is to say, to the left in the drawings, the clutch-plate T will be forced into frictional contact with the side of tray S, and at the same time it will be drawn forwardly with the sliding block $t'$, and thus the tray will be advanced. It will be understood that similar clutch mechanism will be on the opposite side of the tray and operating in unison with that illustrated, and to make this better understood I have shown in Fig. 3 in dotted lines a shaft $t^9$, which extends between and continues the pivotal or rocking centers of the handles $t^7$ on each side. By adjusting the nut $t^8$ up or down the length of stroke imparted to the clutch-plate may be varied when this mechanism is rendered automatic, by the use of a shaft V, Fig. 1, which may be driven from the main shaft, and from a crank-wheel $u$ on this shaft a connecting-rod $u'$ extends to the nut $t^8$.

The surface of the table Q may be divided into parallel channels for the fruit or it may be plain, as here shown.

The entire operation of the machine, briefly stated, is this: The fruit is supplied right side up by hand to the feed-chutes E. Down this it slides by gravity, still being kept right side up by the V shape of the chutes and controlled by the alternately-reciprocating gates F, and is delivered in proper position to the socketed seats D. The knives J and M descend, the former cutting the fruit and forcing the pits out and the latter separating and laying the sections of fruit out on their backs on the head of the shaking table Q. Down the inclined table, assisted by the shake, they slide and are delivered to and spread out upon the constantly-advancing trays.

Having thus described my invention, what I claim as new, and desire to secure by Letters Patent, is—

1. In a fruit pitting and spreading machine, the combination of a vertically-reciprocating knife for severing the fruit and forcing its pit out, a pair of auxiliary knives converging downwardly and movable with the main knife and adapted to enter the fruit from above, and means engaging the upper portions of the auxiliary knives for separating the lower edges thereof, whereby the fruit is opened from its top downward and the sections laid on their backs.

2. In a fruit pitting and spreading machine, the combination, of a reciprocating knife to sever the fruit and force out its pit, a pair of downwardly-converging pivotally-hung auxiliary cutters whose lower edges are adapted to enter, from above, the cut made by the main knife, cranks at the upper portions of the auxiliary knives, and means engaging said cranks and turning the auxiliary knives about their pivots whereby their lower edges separate and force the severed sections apart, and lay them on their backs, and means for advancing the sections to the trays.

3. In a fruit pitting and spreading machine having means for severing the fruit and forcing out its pit, a pair of auxiliary cutters operating with the main cutter, converging downwardly and having cranked upper ends, and means engaging said upper ends to cause the lower edges of the cutters to separate after they have entered the cut made by the main knife and thereby lay the severed sections on their backs.

4. In a fruit pitting and spreading machine having a knife or cutter for severing the fruit and forcing out its pit, a pair of converging auxiliary knives pivotally hung above the fruit, one on each side of the main knife or cutter, and means for engaging the auxiliary knives or cutters at points above their pivots whereby their opposite or converging edges are caused to separate in opposite directions and force the sections apart and lay them on their backs.

5. In a fruit pitting and spreading machine, the combination of knives for severing the fruit and forcing its pit out, a pair of converging, pivotally-hung auxiliary knives or cutters and mechanism engaging their upper ends to cause them to rock on their pivots and separate at their edges, for laying the severed sections on their backs, an inclined shaking table adapted to receive the laid-out severed sections of the fruit and advance them down the incline, and a series of advancing trays adapted to receive said sections.

6. In a fruit pitting and spreading machine, the combination of an inclined feeding device adapted to automatically and successively supply the fruit, a suitable seat for receiving the fruit, knives for severing the fruit and forcing its pit out, a pair of auxiliary knives or cutters for each main knife, pivotally hung at their upper portions, means engaging the auxiliary knives above their pivots whereby they rock about said pivots and separate at their lower ends, for laying the severed sections on their backs, an inclined shaking table adapted to receive the laid-out severed sections of the fruit and advance them, and a series of advancing trays adapted to receive said sections from the inclined table.

7. In a fruit pitting and spreading machine, the combination of a suitable seat to receive the fruit, a vertically-reciprocating knife for severing the flesh of the fruit and forcing its pit out, oppositely-inclined auxiliary knives pivotally secured at their upper ends and arranged one on each side of the splitting-knife, and means engaging the auxiliary knives above their pivots for causing said auxiliary knives to enter the split fruit and separate outwardly away from the splitting-knife, in order to lay out the severed sections of the fruit upon their backs.

8. In a fruit pitting and spreading machine, the combination of a suitable seat for the fruit, a vertically-reciprocating knife for splitting the fruit and forcing its pit out, the inclined auxiliary knives on each side of the splitting-knife, and a means for operating said auxiliary knives to cause them to enter the fruit and separate therein, consisting of cam-slots in which said auxiliary knives play and are pivoted, and devices for moving said knives in said cam-slots.

9. In a fruit pitting and spreading machine, the combination of suitable seats for receiving the fruit, a vertically-movable plate, a splitting-knife carried thereby for severing the fruit and forcing its pit out, plates carried by the vertically-movable plate and having cam-grooves therein, auxiliary knives on each side of the splitting-knife and pivoted and playing in said cam-grooves, and the means for operating said auxiliary knives consisting of a framework with depending rods connected with the pivots of said auxiliary knives, a spring for normally holding said framework up, a rack-sleeve carrying said framework, a segmental gear engaging with said rack-sleeve and a rod connected with the segmental gear and adapted to be stopped by a fixed bar as the main carrying-plate moves down, whereby motion is communicated through the segmental gear and rack-sleeve to force the auxiliary knives down in their cam-slots whereby they are moved into the fruit and then separated to lay out its sections.

10. In a fruit pitting and spreading machine, the combination of a bar having suitable fruit-receiving seats, a cross-plate vertically movable above said bar, a main shaft and connections for reciprocating said plate, a splitting and pit-forcing knife carried by the plate and operating over the fruit whereby the fruit is severed and its pit driven out, plates fixed to said vertically-movable plate and having cam-grooves therein, auxiliary knives on each side of the splitting-knife and pivoted and playing in said cam-grooves, and the means for operating said auxiliary knives consisting of a framework with depending rods connected with the pivots of said auxiliary knives, a spring for normally holding said framework up, a rack-sleeve carrying said framework, a segmental gear engaging with said rack-sleeve and a rod connected with the segmental gear and adapted to be stopped by a fixed bar as the main carrying-plate moves down whereby motion is communicated through the segmental gear and rack-sleeve to force the auxiliary knives down in their cam-slots, whereby they are moved into the fruit and then separated to lay out its sections.

11. In a fruit pitting and spreading machine, the means for advancing the trays consisting of a clutch-plate at the side of the tray, having a shank, a sliding block in which said shank is carried and adapted to slide, a pivoted lever connected with said shank and adapted to force inwardly and to withdraw the clutch-plate, and connections for operating said lever.

12. In a fruit pitting and spreading machine, the means for advancing the trays consisting of a clutch-plate at the side of the tray, having a shank, a sliding block in which said shank is carried and adapted to slide, a pivoted lever connected with said shank and adapted to force inwardly and to withdraw the clutch-plate and connections for operating said lever, consisting of a swinging handle and a connecting-rod therefrom to said lever.

13. In a fruit pitting and spreading machine, the means for advancing the trays consisting of a clutch-plate at the side of the tray, having a shank, a sliding block in which said shank is carried and adapted to slide, a pivoted lever connected with said shank and adapted to force inwardly and to withdraw the clutch-plate and connections for operating said lever, consisting of a swinging handle, a vertically-adjustable nut thereon, a rod connecting said handle with said lever, and means for automatically operating the handle consisting of a driving-shaft, a crank-disk thereon and a connecting-rod from said disk to the nut on the handle.

In witness whereof I have hereunto set my hand.

JAMES HARRISON.

Witnesses:
S. H. NOURSE,
JESSIE C. BRODIE.